(12) United States Patent
B'Far et al.

(10) Patent No.: US 8,805,768 B2
(45) Date of Patent: Aug. 12, 2014

(54) TECHNIQUES FOR DATA GENERATION

(75) Inventors: Reza B'Far, Huntington Beach, CA (US); Yasin Cengiz, Irvine, CA (US); Tsai-Ming Tseng, Irvine, CA (US); Fei Wihardjo, Austin, TX (US); Huyvu Nguyen, Orange, CA (US); Elizabeth Lingg, Brooklyn, NY (US); Sreedhar Chitullapally, Irvine, CA (US); Alan Waxman, Morganville, NJ (US); Steven Miranda, Hillsborough, CA (US); Christopher Leone, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 457 days.

(21) Appl. No.: 12/962,124

(22) Filed: Dec. 7, 2010

(65) Prior Publication Data

US 2012/0143813 A1    Jun. 7, 2012

(51) Int. Cl.
*G06N 5/00* (2006.01)

(52) U.S. Cl.
USPC .................................. 706/52; 702/83; 703/11

(58) Field of Classification Search
USPC ........................................................... 706/52
See application file for complete search history.

(56) References Cited

U.S. PATENT DOCUMENTS

| 2006/0109791 | A1* | 5/2006 | Shimizu | 370/241 |
| 2006/0286514 | A1* | 12/2006 | Gross | 434/156 |
| 2007/0174030 | A1* | 7/2007 | Yun et al. | 703/11 |
| 2010/0153211 | A1* | 6/2010 | Ramer et al. | 705/14.52 |

* cited by examiner

*Primary Examiner* — Alan Chen
*Assistant Examiner* — Kalpana Bharadwaj
(74) *Attorney, Agent, or Firm* — Kilpatrick Townsend & Stockton LLP

(57) ABSTRACT

Techniques, including systems and methods, for generating data are disclosed and suggested herein. Original data used in connection with one or more applications is analyzed in order to determine one or more distribution characteristics for the original data. The distribution characteristics are used to generate data that is similarly distributed. The generated data may be used as seed data for demonstrating, testing, or otherwise using one or more applications.

20 Claims, 5 Drawing Sheets

TECHNIQUES FOR DATA GENERATION

CROSS-REFERENCES TO RELATED APPLICATIONS

This application is related to U.S. patent application Ser. No. 12/684,065 filed on Jan. 7, 2010 and titled "Generic Ontology Based Semantic Business Policy Engine", which claims priority to U.S. Patent Application No. 61/143,088 filed on Jan. 7, 2009; U.S. patent application Ser. No. 12/576,176 filed on Oct. 8, 2009 and titled "Techniques for Processing Ontologies"; U.S. patent application Ser. No. 12/874,821 filed on Sep. 2, 2010 and titled "Massively Scalable Reasoning Architecture," which claims priority to U.S. Provisional Application No. 61/253,054 filed on Oct. 19, 2009; and U.S. patent application Ser. No. 12/581,804, filed on Oct. 19, 2009 and titled "Techniques for Extracting Semantic Data Stores," all of which are incorporated herein by reference in their entirety for all purposes.

BACKGROUND OF THE INVENTION

Embodiments of the present invention relate to policies, and more specifically to techniques for enforcement of policies that utilize information from information sources external to an organization.

The development of many applications, such as enterprise resource planning (ERP) applications, require data for testing purposes. This data for testing (often referred to as test data or seed data) may be used to validate an application's functionality and generally to determine if the application functions properly. Seed data may also be used for other purposes, such as for demonstrating applications to potential customers. Seed data may be created in many different ways. For instance, one way to create seed data is to simply copy existing real data used by one application. Applications, however, often utilize their own logical models (schemas or sets of schemas) for organizing data and data used in connection with one application may be organized differently than another. Transforming original data from one application to seed data for another application, therefore, may involve a costly process of transformation. In addition, original data may be proprietary or may contain confidential information. Thus, use of original data as seed data may require a costly and time-consuming process for transforming the data to address any concerns with the user of the original data.

Accordingly, seed data is typically created manually and/or using computers that perform simple algorithms. An employee, for example, may manually input fictional data. An automated program may generate fictional values. Data created in this manner, however, has several disadvantages. Seed data created manually and/or repetitively according to conventional methods, for instance, may be unrealistic. For instance, data used by applications often have statistical distributions that may not match data generated by conventional methods. Actual data may be distributed according to a Gaussian distribution whereas seed data created according to conventional methods may be distributed according to a uniform distribution. In addition, real data often contains mistakes, variations, correlations, and other characteristics that are difficult to accurately recreate using conventional methods.

Because of the differences between real data and conventionally generated seed data, the use of conventionally generated seed data is not ideal. Demonstrations of applications using conventionally generated seed data, for example, may appear unrealistic. In addition, the use of lower-quality conventionally generated seed data may not test the abilities of an application in the same way that actual data would. For instance, without anomalies in seed data, testers may not see how an application reacts to such anomalies.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques for generating seed data. In one instance, data is generated in connection with execution of one or more applications. As the data is generated, values of the data become distributed in various ways, both statistically and semantically. This data is used to generate data for other applications, such as later versions or even completely new applications. In this manner, the generated data is more realistic than data that has been generated using conventional means. Specifically, the generated data values are distributed in a manner consistent with original data. Anomalies found in original data may also be used to include anomalies in generated data. In this manner, the generated data may be used to realistically test, demonstrate, or otherwise use applications in settings where using actual data is not desirable.

In one embodiment a computer-implemented method of generating data for an application that is performed under the control of one or more computer systems configured with executable instructions is disclosed. The method includes analyzing original data used in connection with one or more applications to determine one or more distribution characteristics for the original data, generating data according to the determined one or more distribution characteristics, and providing the generated data for use in one or more other applications.

In an embodiment, analyzing the original data includes detecting one or more anomalies in the original data. The determined one or more distribution characteristics may be based at least in part on the detected one or more anomalies. In an embodiment, analyzing the data includes determining one or more patterns of the detected anomalies. The determined one or more distribution characteristics may be based at least on the determined one or more patterns. In some instances, the one or more distribution characteristics define one or more parameters for a statistical distribution. The original data may include a plurality of data types, such as invoice line items, employee identifiers, employee names, item numbers, item descriptions, and the like. The one or more distribution characteristics may define one or more relationships between data of different types (such as a relationship between an invoice and a salesperson whose sale resulted in the invoice being generated). The generated data may be organized according to the one or more relationships. Also, the data from which the original data may include a version of a particular application and the application for which the data is generated may include a later version of the particular application. In addition, providing the generated data may include transforming the generated data into a format acceptable for use with the one or more other applications for which the data is generated.

In another embodiment, a computer-readable storage medium that stores executable instructions is disclosed. The executable instructions may cause one or more computer systems to collectively generate seed data, by causing the one or more computer systems to at least: analyze original data used in connection with one or more applications to determine one or more distribution characteristics for the original data; generate data values that are distributed according to the determined one or more distribution characteristics; provide the generated data values for use in one or more other applications.

The instructions may further cause the one or more computer systems to at least store the generated data in a schema suitable for use by the one or more other applications, where the schema is different from an original schema used to store the original data. The instructions may also further cause the one or more computer systems to detect one or more anomalies in the original data. The determined one or more distribution characteristics may be based at least in part on the detected one or more anomalies. Also, the instructions may cause the one or more computer systems to determine one or more patterns of the detected anomalies. The determined one or more distribution characteristics may be based at least on the determined one or more patterns. The one or more distribution characteristics may define one or more parameters for a probability distribution. In an embodiment, the original data includes a plurality of data types, and the one or more distribution characteristics may define one or more relationships between data of different types, and the generated data may be organized according to the one or more relationships.

The one or more applications in connection with which the original data was generated may include a version of a particular application and the one or more other applications for which the data values were generated may include a later version of the particular application. Also, the instructions of the computer-readable storage medium may further cause the one or more computer systems to detect one or more anomalies in the original data and wherein the generated data values include one or more generated anomalies that are based at least in part on the detected anomalies. The instructions may also further cause the one or more computer systems to generate statements that are different from but semantically similar to statements in the original data and include the generated statements with the generated data.

In another embodiment, a computer system for generating data is disclosed. The computer system, in an embodiment, includes one or more processors and memory that includes executable instructions that, when executed by the one or more processors, cause the one or more processors to collectively generate seed data. In particular, in an embodiment, the instructions cause the one or more processors to determine, based at least in part on original data used in connection with one or more applications, one or more distribution characteristics for the original data; generate data values that are distributed according to the determined one or more distribution characteristics; and store the generated data values in a data store for use in one or more other applications.

The instructions may further cause the one or more processors to store the generated data in a schema suitable for use by the one or more other applications, where the schema is different from an original schema used to store the original data. Alternatively or in addition, the instructions may further cause the one or more processors to detect one or more anomalies in the original data. The determined one or more distribution characteristics may be based at least in part on the detected one or more anomalies. The one or more distribution characteristics define one or more parameters for a probability distribution.

DETAILED DESCRIPTION OF THE INVENTION

The following description describes an embodiment of the present invention in the enterprise application domain. However, the scope of the present invention is not restricted to enterprise applications, but may be applied to other domains or applications. For example, any domain where data is needed to test or demonstrate applications makes use of the present invention.

In general, embodiments of the present invention provide techniques for generating realistic seed data. Original data is analyzed and various characteristics of how the original data is distributed are identified. The characteristics may relate to statistical distributions of data values as well as semantic distributions of data. The characteristics may also relate to anomalies found in the original data, such as abnormal values, abnormal relationships among data values, and the like. The characteristics are then used to generate new data that is distributed in a similar manner. For instance, values may be distributed according to probability distributions found in the original data. Textual statements may be semantically similar to textual statements found in the original data. Semantic relationships among the generated data may resemble semantic relationships found in the original data. Generally, any way of characterizing original data and its distribution may be used to generate data that is distributed similarly.

Figure 1:
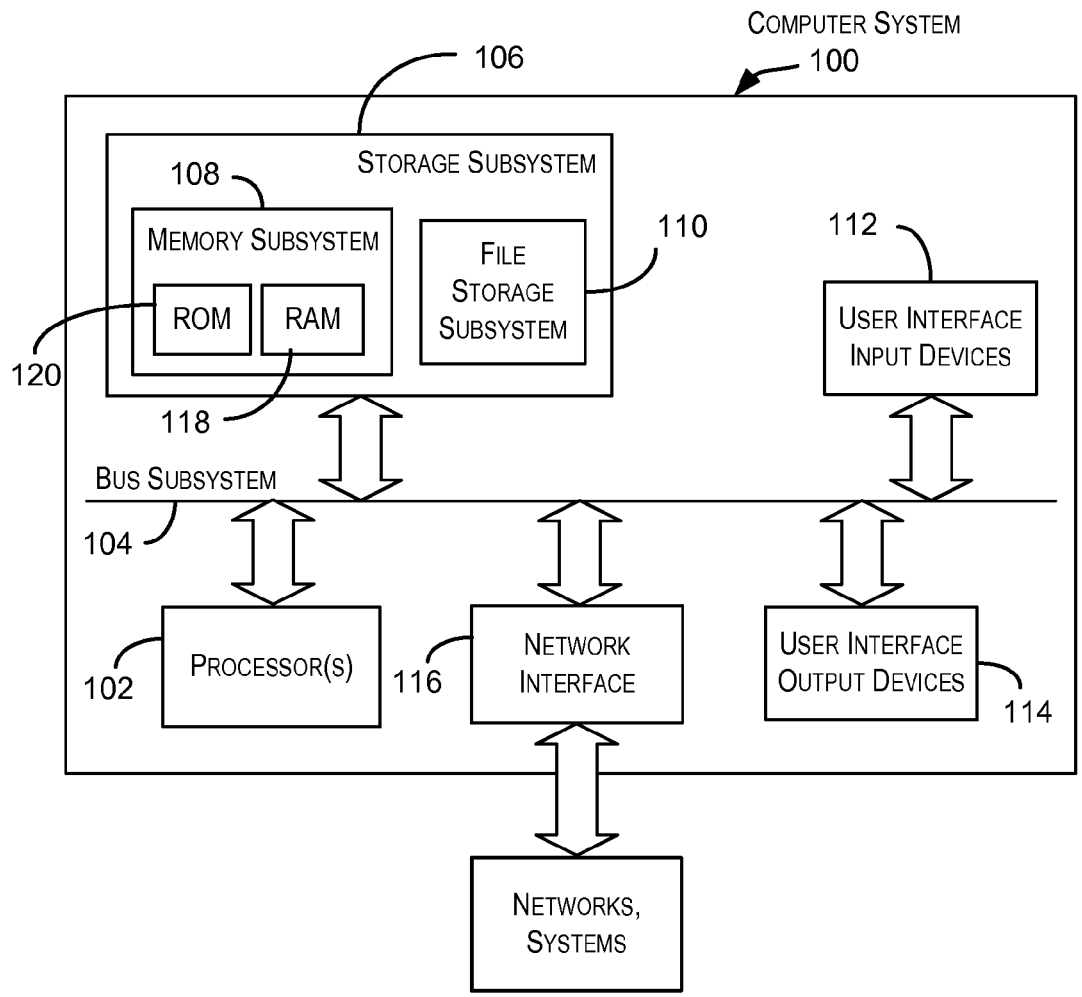
FIG. 1 is a simplified block diagram of a computer system that may be used to practice an embodiment of the present invention.

FIG. 1 is a simplified block diagram of a computer system 100 that may be used to practice an embodiment of the present invention. Computer system 100 may serve to implement one or more of the components shown in FIG. 2. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to direct an application to perform one or more processes described herein, or variations thereof.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Results of application testing using seed data generated according to an embodiment of the invention may be presented to a user using an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read-only memory (ROM) 120 in which fixed instructions are stored. File storage subsystem 110 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
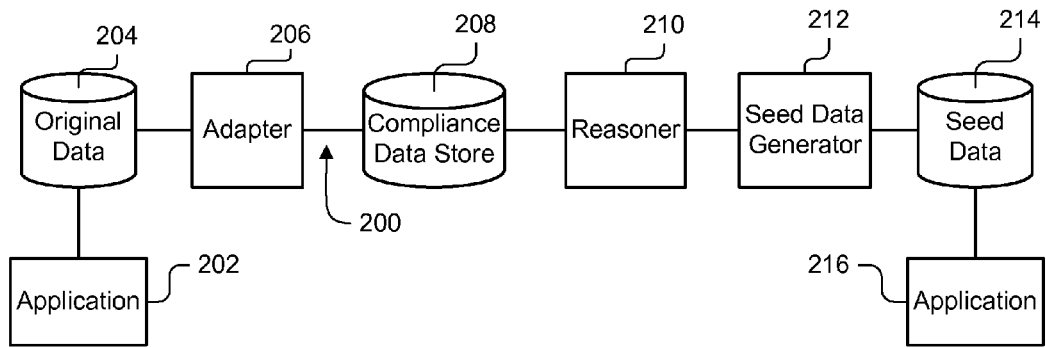
FIG. 2 shows an environment in which the embodiment of the invention may be practiced.

FIG. 2 shows an environment 200 in which embodiments of the invention may be practiced. The components of the environment 200 may include a plurality of computer devices, each of which contains components described above in connection with FIG. 1. For instance, a computing device such as the computing device described above may be utilized in order to execute an application 202 included in the environment 200 which is used by members of an organization in order to facilitate one or more of the organization's activities. Example applications include applications for customer relationship management (CRM), human resources (HR), accounting, serving content and the like. In an embodiment, the application 202 is executed on a server and accessed by members of the organization over a network, which may include a network of the organization, an external network, such as the Internet or other communications network, or combinations of internal and external networks. In another embodiment, however, the application 202 is executed on each of a plurality of user devices. Also, for the purpose of illustration, FIG. 2 shows a single application 202, though more than one application may be used.

Returning to the illustrated embodiment, as the application 202 is used by the organization, data is created and stored in a data store 204. For instance, as an organization acquires new customers, records of the customers may be stored in the data store 204. As those customers make purchases and engage in other recorded activity, records are created and/or modified in the data store 204. For instance, as sales are made, invoices are generated and data corresponding to the generated invoices are stored in the data store 204 accordingly. Generally, the data store 204 may include any data relevant to the conduct of the organization's activities. Also, data in the data store 204 may be organized in one or more corresponding schemas such as relational database schemas, flat file schemas, lightweight directory access protocol (LDAP) schemas, extensible markup language (XML) schemas, and the like.

In an embodiment, an adapter 206 is used to store data from the data store 204 into a compliance data store 208. In an embodiment, the adapter is an application module (or device that implements an application module) that maps one or more schemas to one or more other schemas. In an embodiment, an adapter defines extract, transform, and load (ETL) operations for extracting data from one data store, transforming the data from one schema to another schema, and loading the transformed data into another data store. For example, an adapter may define a mapping from one relational database schema to another relational database schema (or, generally, to any other type of schema) that organizes data in a different manner. In an embodiment, the schema utilized by the compliance data store 208 is a schema optimized for analysis of the data in order to determine whether activities conducted in connection with the organization violate any policies.

In an embodiment, the compliance data store 208 utilizes a schema which implements an ontology where an ontology is a formal representation of the knowledge by a set of concepts and the relationships. An example of how data may be brought into the semantic data store from other data stores used by other applications is provided in U.S. patent application Ser. No. 12/581,804, filed on Oct. 19, 2009 and titled "Techniques for Extracting Semantic Data Stores," which is incorporated herein by reference for all purposes. In an embodiment, a schema in the compliance data store implements an ontology that represents a plurality of semantic objects and their relationships among one another. The semantic objects may be defined to represent commonly-used concepts within the organization as understood by the members of the organization. As an example, an ontology implemented by the compliance data store 208 may define relationships between semantic objects such as employees, sales people, managers, invoices, purchase orders, line items, salaries, payments, and the like. Thus, data stored in the compliance data store 208, in an embodiment, stores data relating to these concepts in a manner that preserves relationships among the actual objects represented by the data. For example, if a salesperson made a sale that generated an invoice, data representing the salesperson and the invoice would be stored in the compliance data store in a manner associating the data representing the invoice with the data representing the salesperson. In an embodiment, the compliance data store 208 stores data ontology web language (OWL) files that define a schema for the data, although other ways of storing data with compliance data store 208, such as relational data tables, may be used.

While, for the purpose of illustration, FIG. 2 shows the compliance data store 208 having data generated in connection with one application, the data store 208 may include data used by multiple applications and stored in different data stores. Different adaptors may be used to load data from respective data stores into the compliance data store 208. Thus, in this manner, data in data stores utilizing a plurality of different schemas may be stored in the compliance data store 208 according to a common schema utilized by the compliance data store 208. In this manner, data from disparate data stores may be related together in a common data store whereas the data may not be related by the separate data stores. For example, an employee may be represented by one identifier in one data store and by another identifier in another data store used for a different purpose. Data associated with the employee in one data store may be related to data associated with the employee in another data store by the compliance data store 208.

In an embodiment, data in the compliance data store 208 is analyzed by a reasoner where a reasoner is an application (or computing device executing an application) that applies one or more rules to a set of data in order to determine one or more conclusions. Reasoners are often referred to as rules engines, or using other terms. Examples of reasoners and techniques for implementing reasoners are provided in: U.S. patent application Ser. No. 12/684,065 filed on Jan. 7, 2010 and titled "Generic Ontology Based Semantic Business Policy Engine", which claims priority to U.S. Patent Application No. 61/143,088 filed on Jan. 7, 2009; U.S. patent application Ser. No. 12/576,176 filed on Oct. 8, 2009 and titled "Techniques for Processing Ontologies"; U.S. patent application Ser. No. 12/874,821 filed on Sep. 2, 2010 and titled "Massively Scalable Reasoning Architecture," which claims priority to U.S. Provisional Application No. 61/253,054 filed on Oct. 19, 2009, all of which are incorporated herein by reference in their entirety for all purposes.

Accordingly, in an embodiment, the reasoner 210 analyzes data from the compliance data store 208 and provides a set of one or more conclusions based on the analysis. In another embodiment, the reasoner 210 analyzes data from the data store 204. The conclusions may include information relating to how the data is distributed, what type of value it has, how some data is related to other data, and the like. In an embodiment, the reasoner 210 is configured to detect one or more anomalies in a set of data, where an anomaly occurs when data satisfies one or more criteria. For instance, an anomaly may occur when a data value exceeds a mean value, median value, or value stored in a data store (such as a retail price) by a certain percentage or other measure. As another example, an anomaly may occur when a payment is identified as authorized by an employee without authority to authorize such payments. Generally, the criteria for occurrences of anomalies may vary based on context and according to user preferences.

In an embodiment, data output by the reasoner 210 is used by a seed data generator 212 to generate seed data. In an embodiment, the seed data generator is an application (or device executing an application) that is operable to receive information regarding a first set of data and generate a second set of data. The seed data generator 212 may organize the second set of data according to a particular schema, although an additional adaptor may be used to transform data from the seed data generator into the desired schema. Thus, in an embodiment, the reasoner 210 outputs data according to one or more schemas and the seed data generator 212 (possibly in conjunction with an adaptor) transforms the data to be stored according to one or more other schemas.

Data from the seed data generator 212, in an embodiment, is stored in a seed data store 214, which is accessible by an application 216. The application 216 may be an application under test, an application to be demonstrated to a potential buyer of the application 216, or, generally, any suitable application.

Variations of the environment shown in FIG. 2 are contemplated as being within the scope of the present invention. For instance, for the purpose of illustration, FIG. 2 shows the reasoner 210 and seed data generator as two separate components. In an embodiment, the reasoner 210 and seed data generator 212 are a single component. The reasoner 210, for example may be configured to be symmetric such that the reasoner can either take data as input, analyze the data, and provide conclusions about the data or receive conclusions about data and generate seed data from the conclusions. Other components may also be combined into single components. As another example of a variation contemplated as being with the scope of the present invention, FIG. 2 shows the reasoner 210 as receiving data from the compliance data store 210. While such a configuration is convenient for allowing minimal access of the original data 204, which may affect performance of the application 202, the reasoner 210 may also analyze the original data.

Figure 3:
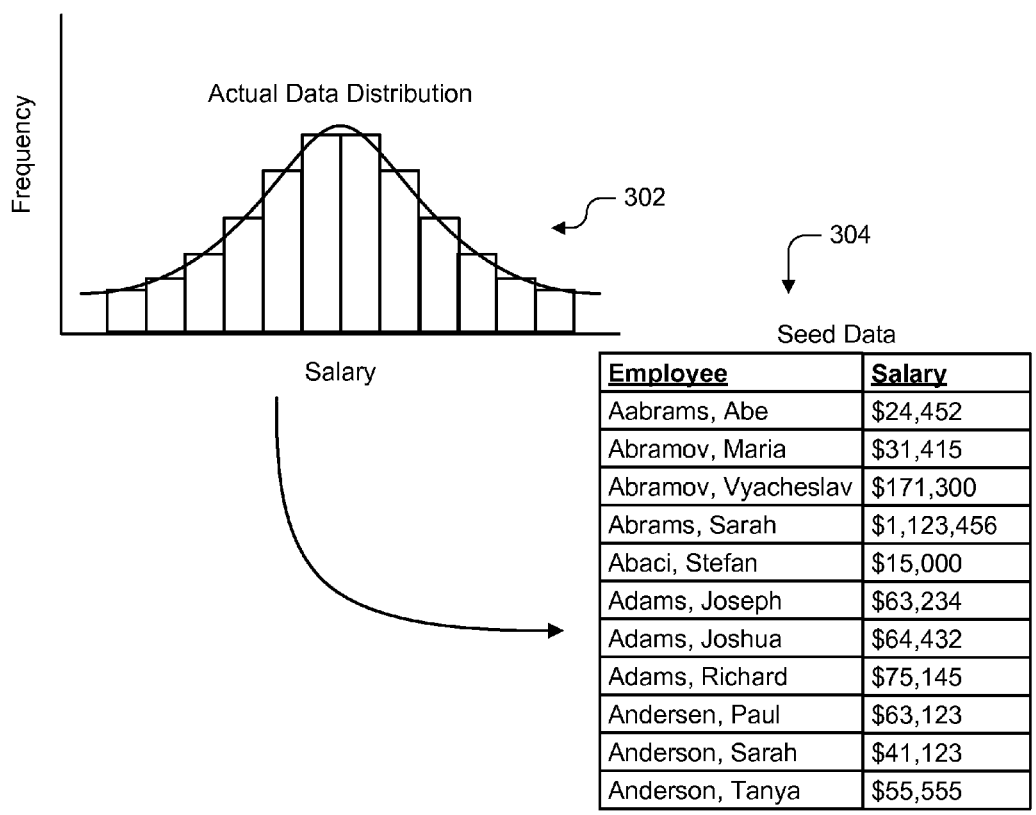
FIG. 3 shows a diagrammatic representation illustrating an example process for generating seed data in accordance with an embodiment.

FIG. 3 shows an illustrative example representation of one manner by which seed data may be generated. The process shown in FIG. 3 may be performed collectively by one or more of the components shown in FIG. 2. Returning to FIG. 3, in an embodiment, a reasoner analyzes original data and determines one or more characteristics relating to how the original data is distributed. In the example shown in FIG. 3, for example, a reasoner has determined that employee salaries are distributed according to a Gaussian distribution. However, characteristics of how the data is distributed may be any information that identifies data distribution. Examples include calculated standard deviations, mean values, average values, variances, and generally any statistical measures of how data is distributed. As will be discussed further below, distribution characteristics of data may also include information identifying how data is distributed semantically in addition to, or as an alternative to, how data is distributed statistically.

In the example in FIG. 3, the actual salary data is distributed according to a particular Gaussian distribution. The particular Gaussian distribution is used to generate salary values that are distributed similarly. In an embodiment, using the distribution to generate seed data involves calculating an approximation of an inverse probability distribution function for the particular Gaussian distribution determined by the reasoner. A set of random numbers is used as input for the approximated inverse probability distribution function in order to determine a plurality of salary values that are distributed according to the Gaussian distribution. Any suitable random number generator may be used to generate the set of random numbers. The size of the set of random numbers may be based at least in part on the size of a data set from the original data. For instance, in the illustrative example, if the original data included salary values for one hundred employees, one hundred random numbers may be used. The size of the set of random numbers may also be user-selected, for instance, to correspond to the number of employees of a company interested in purchasing an application for which the seed data is being generated.

In the illustrative example of FIG. 3, a table has been generated that has employee names associated with salary values, where the salary values are distributed according to the Gaussian distribution. FIG. 3 shows a portion of the table 304. The names for the table 304 may have been generated in a variety of ways. In one embodiment, the names are identical to names in original data or taken from another data store. Names may also be generated in other manners, such as by randomly selecting names from a list of possible names. Statistical distributions of names may also be used to generate a set of names that corresponds to actual distribution names among a general population. Generally, any suitable manner for determining the names for the table 304 may be used.

Figure 4:
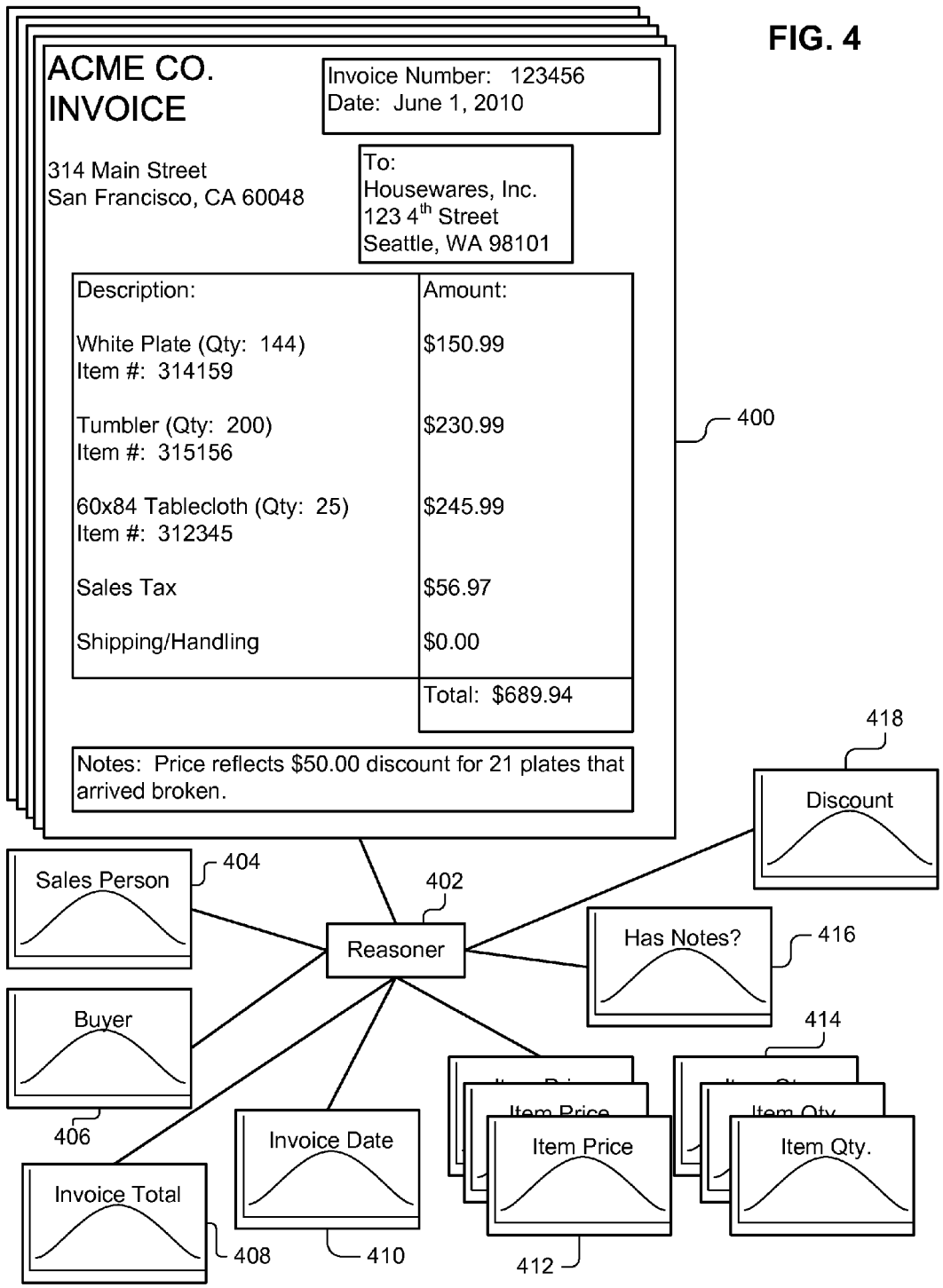
FIG. 4 shows another diagrammatic representation illustrating an example process for generating seed data in accordance with an embodiment.

FIG. 4 shows another illustrative example of how data is analyzed by a reasoner and distribution characteristics are determined. In the example shown in FIG. 4, information for a collection of invoices 400 is stored in a data store. While, for the purposes of illustration, the invoices 400 are shown as actual invoices, data analyzed by a reasoner may be in other forms such as in tables as a relational database. In an embodiment, a reasoner 402 analyzes data associated with a plurality of invoices and determines characteristics of a plurality of distributions for various data related to the invoices 400. For instance, in an organization, each invoice may be associated with a particular salesperson. In an embodiment, the reasoner 402 determines characteristics of a distribution of the invoices among the salespeople of an organization. A reasoner may determine that each salesperson generates approximately an equal number of invoices with little variation. Alternatively, the reasoner 402 may determine that invoices are generated mostly by some sales people and the other sales people may generate little. Generally, statistics characterizing how the invoices are distributed among the sales people may be determined. As another example, the reasoner 402 may determine characteristics of a distribution of buyers associated with the invoices 400. An organization, for instance, may sell to many different customers, or an organization may sell to a few large customers and make very little sales to other customers.

Characteristics of other distributions may also be determined by the reasoner 402. For example, characteristics of a distribution 408 of invoice totals may be determined, as may be distribution 410 of the invoice date. Characteristics of a distribution of invoice dates, for instance, may reflect that a large number of invoices for an organization are generated at some point of the year, such as a few weeks before a Thanksgiving holiday.

Characteristics of distributions may also be determined for individual items of the invoices. For instance, in an embodiment, the invoices 400 include one or more items identified by an item number. In the example visible from the invoices 400, for instance, is shown an item number 314159 and that a quantity of 144 of that item was ordered for that particular invoice. Thus, in an embodiment, the reasoner 402 may calculate characteristics of how quantities are ordered for each inventory item based on the invoices. As an example, the invoice shown in FIG. 3 includes a "White Plate" item. A determination may be made regarding the distribution of a quantity of white plate orders for each invoice that includes an order for a quantity of white plates. The determination may be, for example, that orders for white plates follow a particular Gaussian distribution.

Similarly, for each item, distributions 408 of prices for items on the invoices may be calculated by the reasoner 402. As an example, the price for some items may be uniform across all invoices while the price for other items may vary up to certain amounts. Other distribution characteristics relating to the distribution of data relating to invoices may be calculated by the reasoner 402. Examples include distributions 414 of item quantities, distributions 416 regarding whether invoices have annotations, distributions 418 regarding whether a discount was identified on an invoice, and the like. In an embodiment, the reasoner is operable to utilize various semantic relationships in order to determine its conclusions. In determining whether or not an invoice has a discount applied, for example, the reasoner 402 may compare an invoice price for an item with a stored retail price for the item, even if the retail price does not appear on the invoice. Transitive reasoning may be utilized in order to locate the relevant values for comparison.

As discussed above, information determined by the reasoner 402 may be used to generate data that is distributed according to the characteristics of the distribution store the reasoner has calculated. Similarly, a generating data may be done in a manner that reflects how data is distributed semantically. For instance, in an embodiment, some invoices are annotated and the annotations on invoices are analyzed and semantically similar annotations are generated for seed data.

Figure 5:
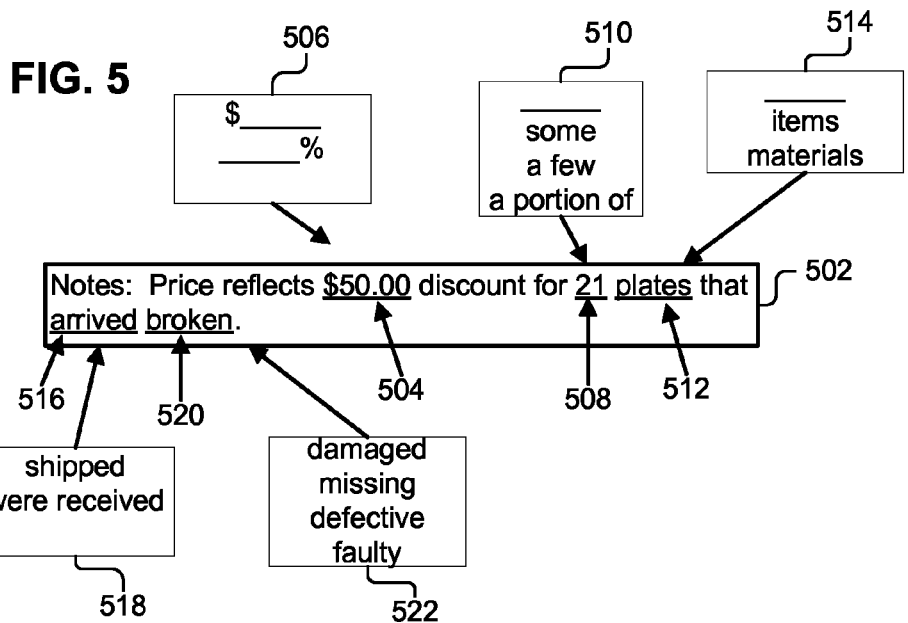
FIG. 5 shows an illustrative example of a transformation of contents into other contents that may be used in accordance with various embodiments.

FIG. 5, accordingly, shows an example of how an annotation for an invoice may be used to generate a semantically similar annotation for seed data. In the illustrated example of FIG. 5, an annotation 502 has been found that shows where the annotation base "price reflects a $50 discount for 21 plates that arrived broken." The annotation 502 may have been identified or generated in various ways. For instance, in an embodiment, the annotation 502 may have been randomly selected from a set of annotations that were determined to be semantically similar. A Levenstein or other algorithm may be used to determine whether annotations are semantically similar. For instance, annotations within a threshold Levenstein distance may be identified as semantically similar. Alternatively, the annotation 502 may have been simply selected from all of the annotations in the original data, may have been selected from a set of annotations not necessarily from the original data, or otherwise generated and/or selected. In an embodiment, one or more parts of the annotation are identified as variables.

One or more rules may be used to identify variable portions of the annotation. For instance, the annotation may be analyzed to determine one or more nouns, verbs, or other parts of speech, or phrases. One or more of the determined portions of the annotation may be identified as variable and replaced with a value to generate a new annotation. For example, FIG. 5 shows a price of $50.00 identified as a discount variable 504 that is replaced with a discount value 506, such as a monetary value or a percentage. Other examples provided in the figure include: a quantity identified as a quantity variable 508 that may be replaced with a quantity value 510 that may be a numerical value or an appropriate word or phrase, such as "some" or "a few" or "portion of" and an inventory item identified as an inventory item variable 512 that may be replaced with an inventory item value such as an inventory item name, or an appropriate word or phrase, such as "items" or "materials." Also shown as illustrative examples are a verb "arrived" identified as a verb variable 516 that may be replaced with a semantically similar verb or verbal phrase such as "shipped" or "were received" and a verb "broken" identified as another verbal variable 520 that may be replaced with a semantically similar verb or adjective value, such as "damaged," "missing," "defective," or "faulty."

In this manner, annotations for invoices and other similar objects may be used to generate different annotations or other objects that are different, but that exhibit characteristics of actual data. Thus, data generated using such techniques provides seed data that is realistic. Thus, applications using the seed data can be tested more reliably and demonstrated more realistically.

Figure 6:
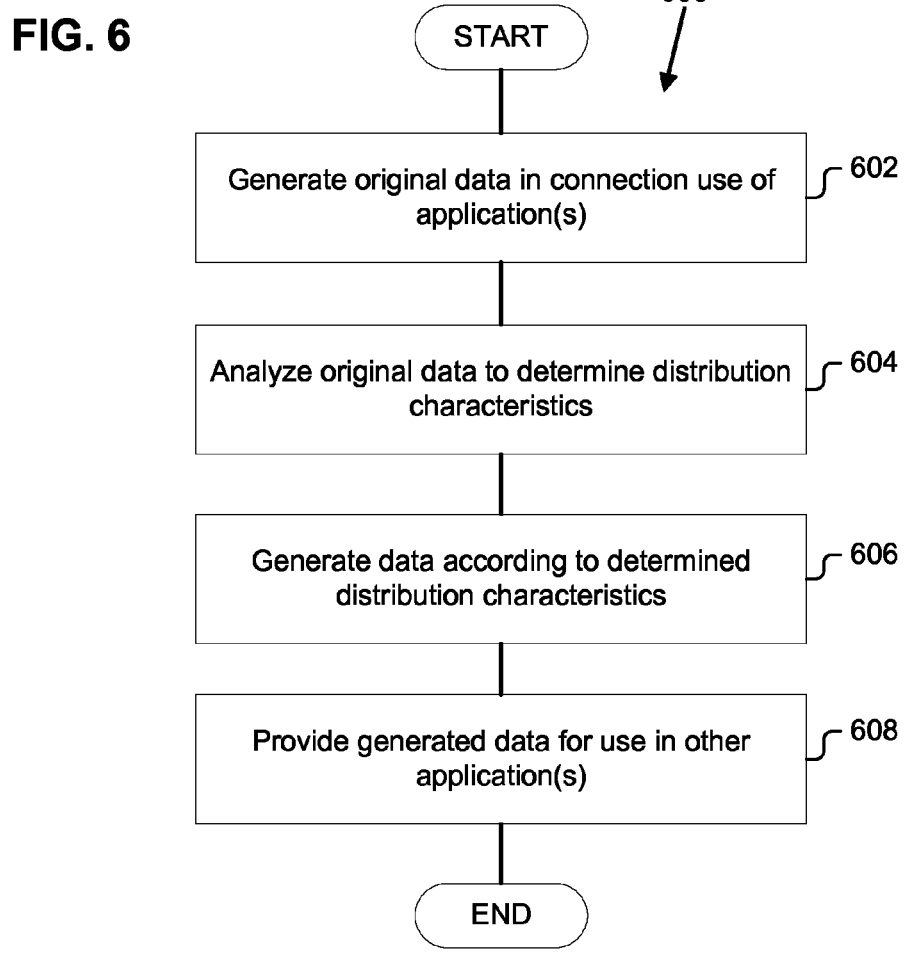
FIG. 6 shows a diagrammatic representation of a process for providing seed data in accordance with an embodiment.

FIG. 6 shows an illustrative example of a process 600 for providing seed data for an application according to an embodiment. The process 600, or generally any process described herein or variations thereof, may be performed under the control of one or more computer systems configured with executable instructions. Executable instructions may be stored collectively on one or more computer-readable storage media. In the embodiment, the original data is generated 602 in connection with use of one or more applications, such as CRM applications, ERP applications, electronic mail applications, and, generally, any application that may be used in connection with data generation. As discussed, the different data can vary widely, depending on the particular application being used. In addition, with the original data stored, the original data is analyzed at block 604 to determine distribution characteristics of the original data. In an embodiment, distribution characteristics include information identifying how the original data is distributed according to one or more statistical and/or semantic distributions. Analyzing data may be done in one or more ways.

In an embodiment, analyzing the data may be done in a variety of ways or combinations thereof. In one embodiment, one or more neural networks are constructed and trained using original data. As an example, for each of a set of fraudulent transactions, a set of data may be identified as related to the fraudulent transaction and used to train a neural network that takes as input similar data and outputs whether the data represents a likely fraudulent transaction. Generally, neural networks can be used to receive various sets of data and provide an output that classifies the set of data. Examples of classifications include identification from data activities that are abnormal in one or more respects, fraudulent, and the like. In another embodiment, a Baysian network is constructed and utilized in order to determine one or more characteristics of the data. A Baysian network is a directed acyclic graph whose nodes represent points in data and edges represent conditional probabilities between the nodes. As an example, one node may represent an anomaly in the data and other nodes connected to the anomaly-related node by an edge may be possible causes of the anomaly. The nodes and edges connecting the nodes in the Baysian network may be generated based at least in part on measurements in the original data. In yet another embodiment, various pattern recognition algorithms are applied to the original data in order to detect patterns in the data. Pattern recognition algorithms include deterministic digital signal processing (DSP) pattern recognition algorithms. Various pattern recognition techniques may identify features of the original data, such as correlations among data, and the like. Statistical calculations regarding data, such as means, averages, variances, standard deviations, and other statistics may be calculated. Generally, any technique for identifying characteristics of data distribution may be used, including combinations of techniques.

If data is analyzed using one or more techniques that require training, such as various techniques involving neural network construction, the techniques may be validated in order to minimize error when determined distribution characteristics are used to generate seed data. Validation may include manually verifying the results from the utilized techniques or verifying the results using automated methods.

When the distribution characteristics are determined, seed data is generated based at least in part on the distribution characteristics. In an embodiment, seed data is generated to have one or more of the determined characteristics, or one or more characteristics that are substantially similar to the determined characteristics. For instance, continuing the example of invoices, data corresponding to a plurality of invoices having associated data values distributed consistently with distributions determined from the original data may be generated. For the generated invoices, if approximately 25% of invoices in original data are annotated, then, in an embodiment, approximately 25% of generated invoices will include an annotation. The annotations generated may be different from, but semantically similar to, annotations in original data and may be grouped by semantic similarity in a manner consistent with original data. Similarly, if values on invoices are distributed according to probability distributions, corresponding values in seed data will follow the same probability distributions.

In an embodiment, if the generated seed data is provided for use in other applications, embodiments within these other applications may include storing the data in the data store that is accessible by the one or more applications. In this manner, the generated data may be used to test applications, to demonstrate applications, and the like.

Figure 7:
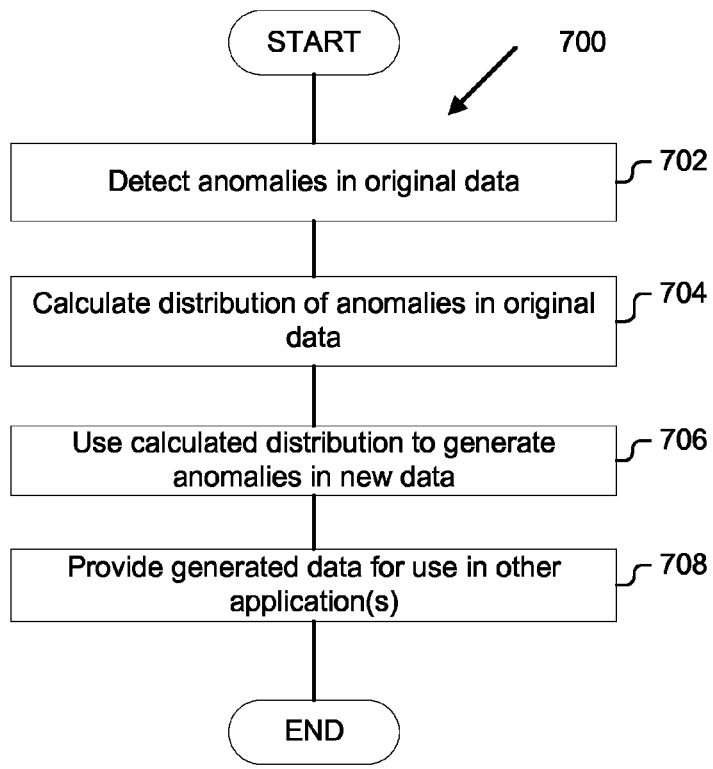
FIG. 7 shows a diagrammatic representation of a process that may be used to replicate anomalies from original data and seed data in accordance with an embodiment.

FIG. 7 shows an illustrative example of a process 700 for providing seed data in accordance with an embodiment. The process 700 may be used in connection with the process 600 described above in connection with FIG. 6. In an embodiment, anomalies are detected in original data. As discussed, an anomaly may be an occurrence value for data that, according to one or more criteria, deviates from an established rule or trend. An example may be a unit price for an item on an invoice that deviates from a retail price by some threshold. The threshold may be an absolute number or dependant on another value. For instance, the threshold may be deviation by a certain percentage from a mean value. Another example may be an invoice having a number of line items deviating from an average number of line items according to some more advanced criteria such as, for instance, an anomaly with respect to the number of line items in an invoice, when an invoice for a customer deviates by some percentage of an average for that customer. Detection of the anomalies may be accomplished in any suitable manner, such as those discussed above.

In an embodiment, the distribution of the detected anomalies is calculated 704. Calculating the distribution of the detected anomalies may include determining how the detected anomalies are distributed over a set of other data. Determining the distribution may include calculating parameters for a probability distribution function. As an example, a mean and variance of a Gaussian distribution of invoice-related anomalies for each of a group of sales people may be determined. In this manner, it may be determined that sales people are generally associated with the same number of anomalies or that certain sales people tend to be associated with more anomalies than others. Generally, any suitable way of determining how anomalies are distributed may be utilized.

With the distribution of anomalies calculated, the calculated distribution is used to generate 706 anomalies in seed data. Using the distribution of anomalies to generate anomalies in seed data may be accomplished, for instance, by distributing anomalies according to a calculated probability distribution. For instance, if parameters for a Gaussian distribution of the number of line item anomalies for each sales person was calculated, the parameters may be used to associate sales people (which may be fictional sales people identified in seed data) with a number of anomalies according to the distribution. Anomalies may be distributed in any suitable manner for various data values. In this manner, anomalies in seed data are distributed in a manner consistent with the original data. In an embodiment, the generated seed data is provided 708, such as in the manner described above.

Figure 8:
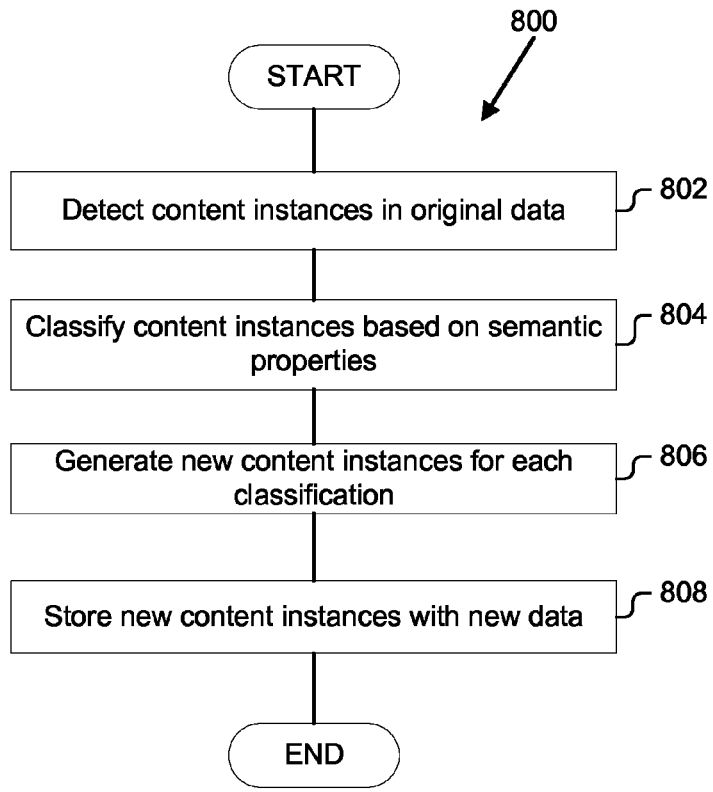
FIG. 8 shows a diagrammatic representation of a process for generating content for seed data in accordance with an embodiment.

FIG. 8 shows an illustrative example of a process 800 for generating content-related seed data that may be used in connection with the processes described above, or variations and/or combinations thereof. In an embodiment, content instances in original data is detected 802. A content instance, in an embodiment, is data corresponding to content. A content instance may be a string that was generated according to user input, strings that were generated by automated processes, and other content. Example content instances include annotations in data, narratives stored in data, and the like. Content instances may also include pictures, video, audio, certain files, and other types of content.

In an embodiment, the detected content instances are classified 804 based at least in part on semantic properties. For instance, annotations found in original data may be grouped according to semantic similarity as determined using a Levenstein or other suitable algorithm. Once the content instances are classified, in an embodiment, new content is generated 806 for each classification. Generation of new content instances may be done in accordance with the above description. For instance, one or more content instances from a classification may be identified. For each identified content instance, a variable portion may be identified and replaced with a semantically similar portion. The new content instances may be stored 808 for use as seed data.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of generating data for an application, comprising:
    storing, by an adaptor module of a computer system, original data used in connection with one or more applications related to an organization;
    defining, by a compliance module of the computer system, a schema representing the original data, the schema optimized for analysis of the original data in order to determine one or more activities in connection with policy violation related to the organization;
    analyzing, by a reasoning module of the computer system, the original data in accordance with the defined schema to determine one or more distribution characteristics for the original data;
    generating data according to the determined one or more distribution characteristics of the original data;

determining a distribution of the generated data based at least in part on semantic properties in the distribution characteristics of the original data; and providing the generated data for use in one or more other applications.

2. The computer-implemented method of claim 1, wherein analyzing the original data includes detecting one or more anomalies in the original data and wherein the determined one or more distribution characteristics are based at least in part on the detected one or more anomalies.

3. The computer-implemented method of claim 2, further comprising determining one or more patterns of the detected anomalies and wherein the determined one or more distribution characteristics are based at least on the determined one or more patterns.

4. The computer-implemented method of claim 1, wherein the one or more distribution characteristics define one or more parameters for a statistical distribution.

5. The computer-implemented method of claim 1, wherein the original data includes a plurality of data types, wherein the one or more distribution characteristics define one or more relationships between data of different types, and wherein the generated data is organized according to the one or more relationships.

6. The computer-implemented method of claim 1, wherein the one or more applications include a version of a particular application and wherein the one or more other applications include a later version of the particular application.

7. The computer-implemented method of claim 1, wherein providing the generated data includes transforming the generated data into a format acceptable for use with the one or more other applications.

8. A non-transitory computer-readable storage medium having stored thereon executable instructions that cause one or more computer systems to collectively generate data, the instructions including instructions that cause the one or more computer systems to at least:

store original data used in connection with one or more applications related to the organization;

define a schema representing the original data, the schema optimized for analysis of the original data in order to determine one or more activities in connection with policy violation related to the organization;

analyze the original data in accordance with the defined schema to determine one or more distribution characteristics for the original data;

generate data values that are distributed according to the determined one or more distribution characteristics of the original data;

determine a distribution of the generated data based at least in part on semantic properties in the distribution characteristics of the original data; and provide the generated data values for use in one or more other applications.

9. The non-transitory computer-readable storage medium of claim 8, wherein the instructions further cause the one or more computer systems to at least store the generated data in a schema suitable for use by the one or more other applications, the schema being different from an original schema used to store the original data.

10. The non-transitory computer-readable storage medium of claim 8, wherein the instructions further cause the one or more computer systems to detect one or more anomalies in the original data and wherein the determined one or more distribution characteristics are based at least in part on the detected one or more anomalies.

11. The non-transitory computer-readable storage medium of claim 8, wherein the instructions further cause the one or more computer systems to determine one or more patterns of the detected anomalies and wherein the determined one or more distribution characteristics are based at least on the determined one or more patterns.

12. The non-transitory computer-readable storage medium of claim 8, wherein the one or more distribution characteristics define one or more parameters for a probability distribution.

13. The non-transitory computer-readable storage medium of claim 8, wherein the original data includes a plurality of data types, wherein the one or more distribution characteristics define one or more relationships between data of different types, and wherein the generated data is organized according to the one or more relationships.

14. The non-transitory computer-readable storage medium of claim 8, wherein the one or more applications include a version of a particular application and wherein the one or more other applications include a later version of the particular application.

15. The non-transitory computer-readable storage medium of claim 8, wherein the instructions further cause the one or more computer systems to detect one or more anomalies in the original data and wherein the generated data values include one or more generated anomalies that are based at least in part on the detected anomalies.

16. The non-transitory computer-readable storage medium of claim 8, wherein the instructions further cause the one or more computer systems to generate statements that are different from but semantically similar to statements in the original data and include the generated statements with the generated data.

17. A computer system for generating data, comprising:
one or more processors; and
memory including executable instructions that, when executed by the one or more processors, cause the one or more processors to collectively at least:

store original data used in connection with one or more applications related to an organization;

define a schema representing the original data, the schema optimized for analysis of the original data in order to determine one or more activities in connection with policy violation related to the organization;

determine, based at least in part on the original data and the defined schema, one or more distribution characteristics for the original data;

generate data values that are distributed according to the determined one or more distribution characteristics of the original data;

determine a distribution of the generated data based at least in part on semantic properties in the distribution characteristics of the original data; and store the generated data values in a data store for use in one or more other applications.

18. The computer system of claim 17, wherein the instructions further cause the one or more processors to store the generated data in a schema suitable for use by the one or more other applications, the schema being different from an original schema used to store the original data.

19. The computer system of claim 17, wherein the instructions further cause the one or more processors to detect one or more anomalies in the original data and wherein the determined one or more distribution characteristics are based at least in part on the detected one or more anomalies.

20. The computer system of claim 17, wherein the one or more distribution characteristics define one or more parameters for a probability distribution.

\* \* \* \* \*

UNITED STATES PATENT AND TRADEMARK OFFICE
CERTIFICATE OF CORRECTION

PATENT NO.        : 8,805,768 B2                                          Page 1 of 1
APPLICATION NO.   : 12/962124
DATED             : August 12, 2014
INVENTOR(S)       : B'Far et al.

It is certified that error appears in the above-identified patent and that said Letters Patent is hereby corrected as shown below:

In the Specification

In column 11, line 44, delete "Baysian" and insert -- Bayesian --, therefor.

In column 11, line 46, delete "Baysian" and insert -- Bayesian --, therefor.

In column 11, line 52, delete "Baysian" and insert -- Bayesian --, therefor.

Signed and Sealed this
Nineteenth Day of May, 2015

Michelle K. Lee
*Director of the United States Patent and Trademark Office*